(12) United States Patent
Dodd

(10) Patent No.: US 7,076,617 B2
(45) Date of Patent: Jul. 11, 2006

(54) ADAPTIVE PAGE MANAGEMENT

(75) Inventor: James M. Dodd, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 476 days.

(21) Appl. No.: 10/676,781

(22) Filed: Sep. 30, 2003

(65) Prior Publication Data
US 2005/0071581 A1    Mar. 31, 2005

(51) Int. Cl.
G06F 12/00 (2006.01)
(52) U.S. Cl. .......................... 711/156; 711/5; 711/105; 711/148; 711/154
(58) Field of Classification Search .............. 711/156, 711/5, 105, 148, 154
See application file for complete search history.

(56) References Cited

U.S. PATENT DOCUMENTS

| | | | |
|---|---|---|---|
| 5,603,010 A | 2/1997 | Dodd et al. | |
| 6,199,145 B1* | 3/2001 | Ajanovic et al. | 711/149 |
| 6,370,624 B1* | 4/2002 | Ajanovic et al. | 711/149 |
| 6,389,514 B1 | 5/2002 | Rokicki | |
| 6,400,681 B1 | 6/2002 | Bertin et al. | |
| 6,401,180 B1 | 6/2002 | Hartmann | |
| 6,505,282 B1 | 1/2003 | Langendorf et al. | |
| 6,507,530 B1 | 1/2003 | Williams et al. | |
| 6,553,449 B1 | 4/2003 | Dodd et al. | |
| 6,697,888 B1 | 2/2004 | Halbert et al. | |
| 6,725,349 B1 | 4/2004 | Langendorf et al. | |
| 6,742,098 B1 | 5/2004 | Halbert et al. | |
| 6,766,385 B1 | 7/2004 | Dodd et al. | |
| 6,799,241 B1* | 9/2004 | Kahn et al. | 711/105 |
| 2003/0126354 A1* | 7/2003 | Kahn et al. | 711/105 |
| 2003/0182513 A1 | 9/2003 | Dodd et al. | |
| 2004/0015645 A1 | 1/2004 | Dodd et al. | |
| 2004/0042320 A1 | 3/2004 | Dodd et al. | |
| 2004/0044832 A1 | 3/2004 | Dodd | |
| 2004/0088450 A1 | 5/2004 | Dodd et al. | |
| 2004/0158677 A1 | 8/2004 | Dodd | |
| 2004/0243768 A1 | 12/2004 | Dodd et al. | |

OTHER PUBLICATIONS

U.S. Appl. No. 10/229,617, pending, filed Aug. 27, 2002, Dodd et al.
U.S. Appl. No. 10/229,655, pending, filed Aug. 27, 2002, James Dodd.
U.S. Appl. No. 10/284,596, pending, filed Oct. 30, 2002, Puffer et al.
Pending U.S. Appl. No. 09/664,516, P9606, entitled: "System and Method for Controlling Data Flow Direction in a Memory System", filed Sep. 29, 2000.
Pending U.S. Appl. No. 09/677,137, P9616, entitled: "Method and Apparatus for Managing Power in a Memory Component While Maintaining High Performance", filed Feb. 29, 2000.
Pending U.S. Appl. No. 09/666,489, P9836, entitled: "Buffering Data Transfer Between a Chipset and Memory Modules", filed Sep. 18, 2000.

* cited by examiner

*Primary Examiner*—Stephen C. Elmore
(74) *Attorney, Agent, or Firm*—Jeffrey B. Huter

(57) ABSTRACT

Machine-readable media, methods, and apparatus are described which process memory transactions. In some embodiments, a memory controller of a processor and/or chipset may adaptively determine whether to close pages of a memory in an attempt to increase perceived memory performance.

23 Claims, 6 Drawing Sheets

ADAPTIVE PAGE MANAGEMENT

BACKGROUND

Computing devices typically comprise a processor, memory, and a memory controller to provide the processor as well as other components of the computing device with access to the memory. The performance of such computing devices is strongly influenced by the "memory read latency" and "memory write latency" of the computing device. In general, the "memory read latency" is the length of time between when the processor requests the memory controller to retrieve data from the memory and when the memory controller provides the processor with the requested data. Similarly, the "memory write latency" is generally the length of time between when the processor requests the memory controller to write data to the memory and when the memory controller indicates to the processor that the data has been or will be written to the memory.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for managing pages of a memory device. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
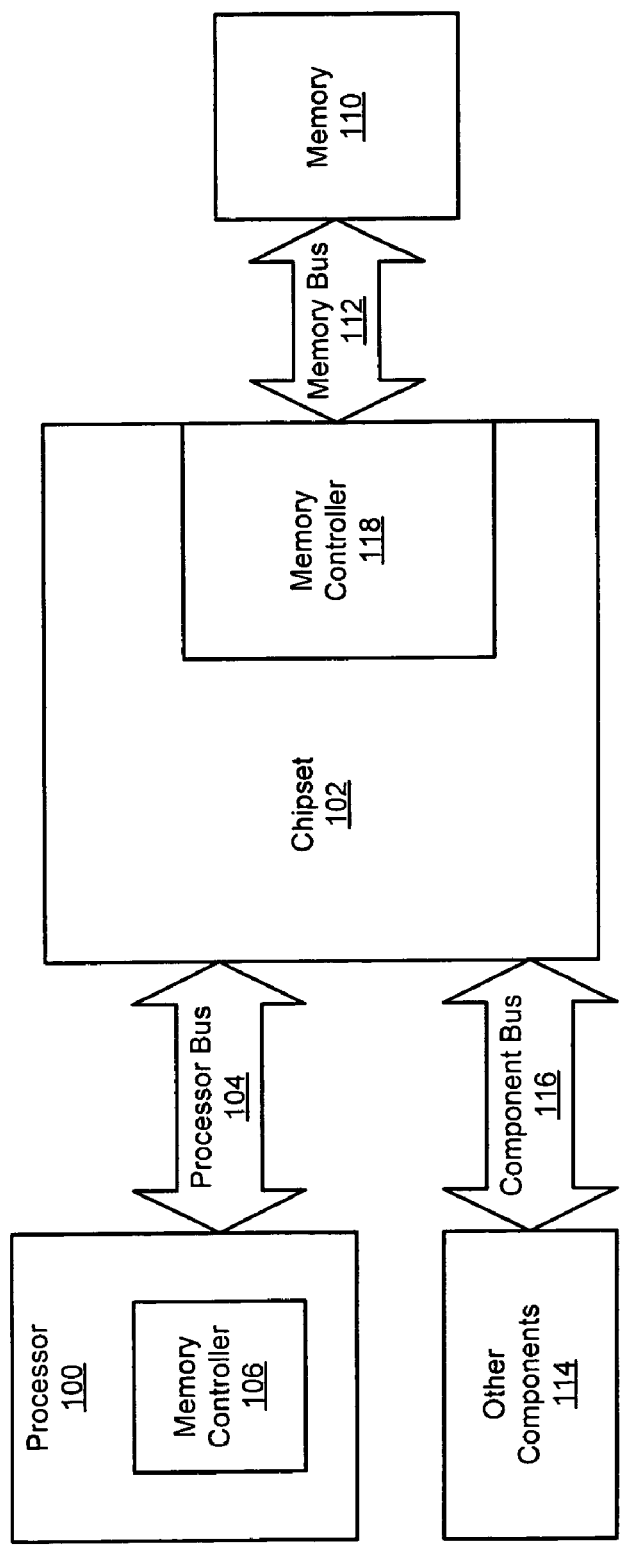
FIG. 1 illustrates an embodiment of a computing device.

An embodiment of a computing device is shown in FIG. 1. The computing device may comprise a processor 100 and a chipset 102 coupled to one another via a processor bus 104. The processor 100 may comprise a memory controller 106 to dispatch read and/or write memory transactions on the processor bus 104. Moreover, the memory controller 106 of the processor 100 may provide the chipset 102 with page close messages. In one embodiment, the processor memory controller 106 may determine based upon pending memory transactions of the processor 100 whether closing open pages 108 of a memory 110 (See, FIG. 3) may be beneficial to memory performance. In response to determining that closing open pages 108 may be beneficial, the processor memory controller 106 may provide the chipset 102 with a page close message that requests the chipset 102 to close a page 108 of the memory 110.

The chipset 102 may comprise one or more integrated circuit packages or chips that couple the processor 100 to the memory 110 via a memory bus 112 and to other components 114 of the computing device such as, for example, BIOS firmware, keyboards, mice, storage devices, network interfaces, etc via one or more other buses 116. In particular, the chipset 102 may include a memory controller 118 to access the memory 110 via the memory bus 112 in response to memory transactions received from the processor 100 and other components 114 of the computing device. In one embodiment, the chipset memory controller 118 may determine based upon pending memory transactions received from the processor 100 and other components 114 whether closing open pages 108 of the memory 110 may be beneficial to memory performance. In response to determining that closing open pages 108 may be beneficial, the chipset memory controller 118 may cause the memory 110 to close one or more open pages 108 of the memory 110.

Figure 2:
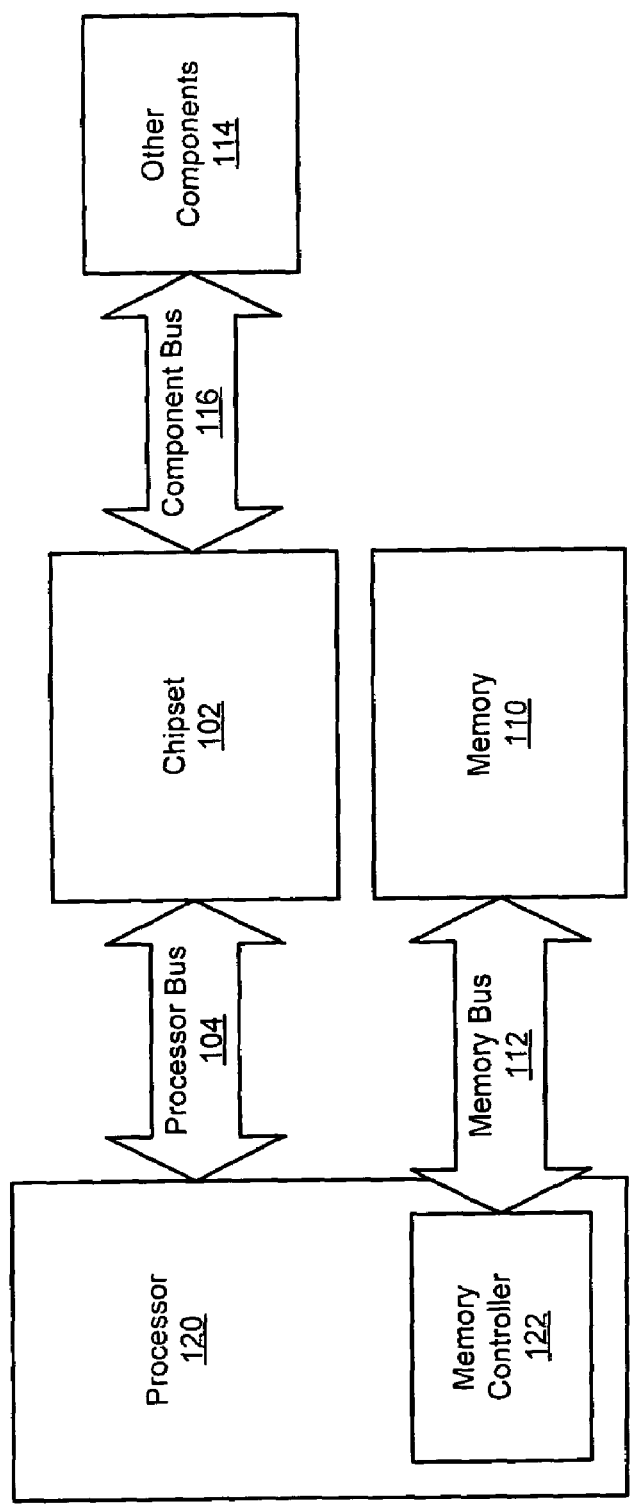
FIG. 2 illustrates another embodiment of a computing device.

Another embodiment of a computing device is shown in FIG. 2. The computing device of FIG. 2 may comprise a processor 120 and a chipset 102 coupled via a processor bus 104. The chipset 102 may comprise one or more integrated circuit packages or chips that couple the processor 100 to other components 114 of the computing device such as, for example, BIOS firmware, keyboards, mice, storage devices, network interfaces, etc.

The processor 100 may further comprise a memory controller 122 coupled to memory 110 via a memory bus 112. The memory controller 122 may access the memory 110 in response to memory transactions of the processor 100 and/or memory transactions received from the chipset 102 on the behalf of the other components 114 of the computing device.

In one embodiment, the processor memory controller 106 may determine based upon pending memory transactions of the processor 100 and other components 114 whether closing open pages 108 of the memory 110 may be beneficial to memory performance. In response to determining that closing open pages 108 may be beneficial, the processor memory controller 122 may cause the memory 110 to close one or more open pages 108 of the memory 110.

Figure 3:
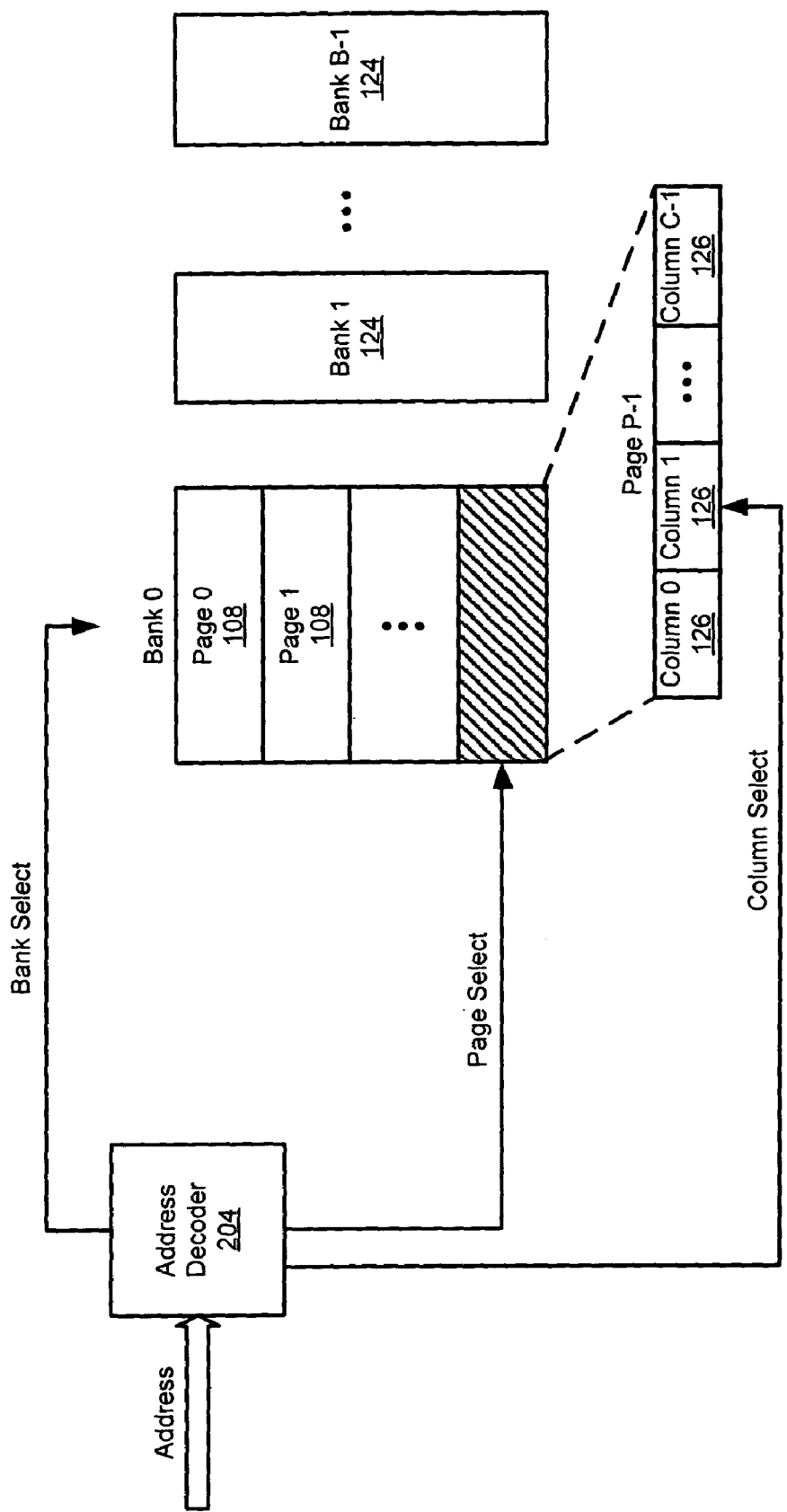
FIG. 3 illustrates an embodiment of a hierarchal memory arrangement of the memory depicted in FIGS. 1 and 2.

The memory 110 of FIG. 1 and FIG. 2 may comprise various memory devices that provide addressable storage locations which the memory controllers 118, 122 may read data from and/or write data to. The memory 110 may comprise one or more different types of memory devices such as, for example, DRAM (Dynamic Random Access Memory) devices, SDRAM (Synchronous DRAM) devices, DDR (Double Data Rate) SDRAM devices, or other memory devices. As shown in FIG. 3, the memory devices of the memory 110 may be arranged in a hierarchal manner. In particular, the memory 110 may comprise one or more banks 124. Each bank 124 may comprise one or more pages or rows 108. Further, each page 108 may comprise one or more columns 126. In other embodiments, the memory 110 may comprise more hierarchal levels than depicted in FIG. 3. Similarly, the memory 110 in other embodiments may comprise less hierarchal levels than depicted in FIG. 3.

Figure 4:
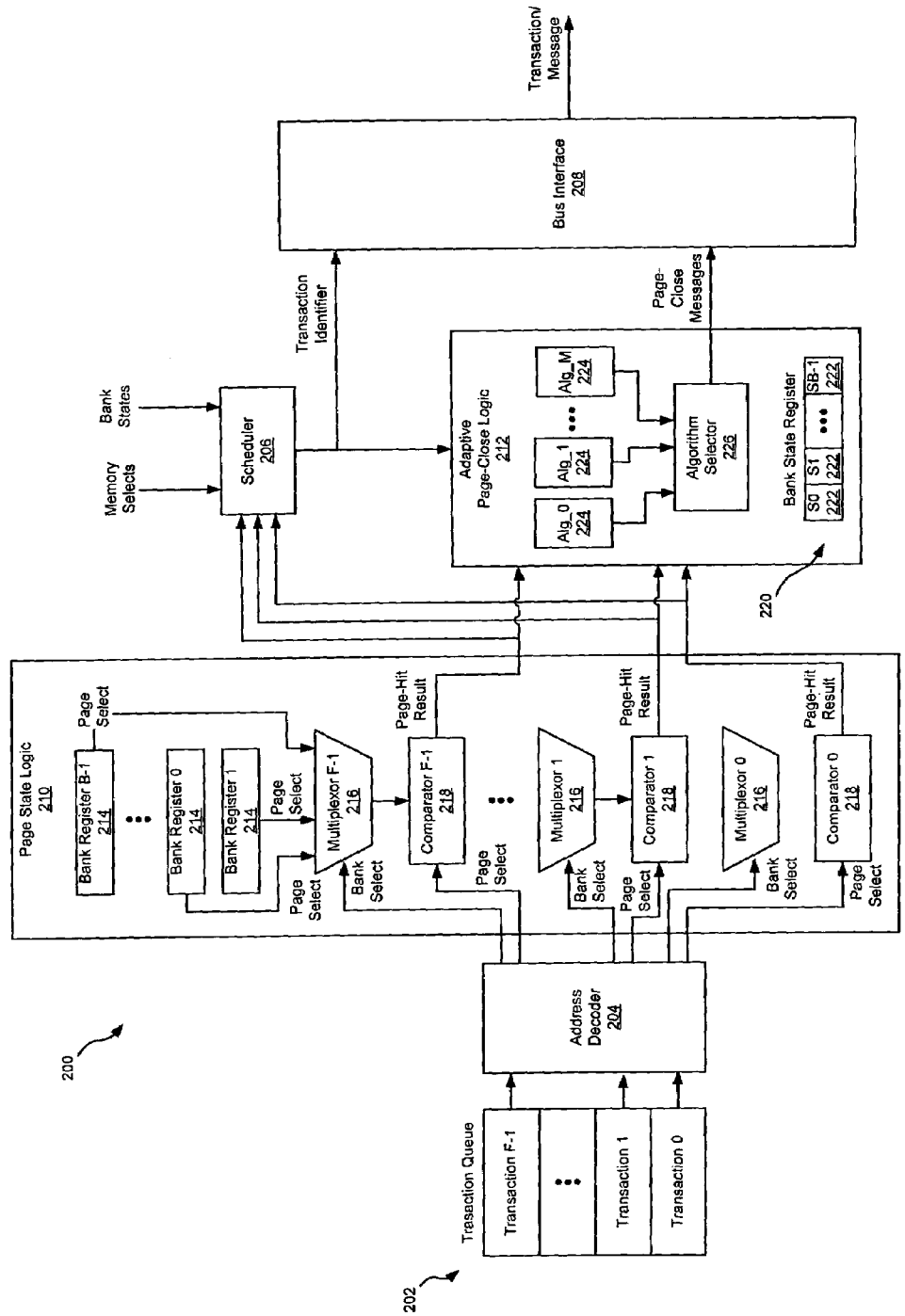
FIG. 4 illustrates an embodiment of the memory controllers depicted in FIGS. 1 and 2.

In FIG. 4, there is shown an embodiment of a memory controller that comprises a page manager 200, a transaction queue 202, an address decoder 204, and a scheduler 206. In the computing device of FIG. 1, the processor memory controller 106 may comprise the circuitry of FIG. 4 in order to schedule memory transactions and provide the chipset 102 with page close messages for memory transactions dispatched to the chipset 102. Furthermore, the chipset memory controller 118 may also comprise the circuitry of FIG. 4 to schedule memory transactions to the memory 110 and to close pages 108 of the memory 110. Similarly, in the computing device of FIG. 2, the processor memory controller 122 may comprise the circuitry of FIG. 4 in order to schedule pending memory transactions and to close pages 108 of the memory 110.

The transaction queue 202 may store or queue memory transactions generated by the processor 100 in the case of the processor memory controllers 106, 122 or received from the processor 100 and/or other components 114 in case of the chipset memory controller 118. In one embodiment, the transaction queue 202 may be implemented as a first-in-first-out (FIFO) queue having a tail into which memory transactions may be may pushed a head from which memory transactions may be popped. In another embodiment, the transaction queue 202 may be implemented via a plurality of storage elements that enable memory transactions to be removed from the transaction queue and dispatched toward the memory 110 in an order that differs from the order in which the memory transactions were stored in the transaction queue 202.

The address decoder 204 may decode addresses of the memory transactions stored in the transaction queue 202. The address decoder 204 may decode the addresses of the memory transactions to generate one or more selects that correspond to the hierarchal arrangement of the memory 110 and that may be used to select or address a particular storage location of the memory 110. In one embodiment, the address decoder 204 may determine and generate a bank select, a page select, and a column select that respectively select a bank 124, a page 108, and a column 126 of the memory 110. (See, FIG. 3.). In another embodiment, the address decoder 204 of the processor memory controller 106 may partially decode the addresses of the memory transactions. For example, the address decoder 204 of the processor memory controller 106 may only determine and generate a bank select and a page select for each memory transaction of the transaction queue 202.

The scheduler 206 may select memory transactions of the transaction queue 202 for processing based upon memory selects (e.g. bank, page, and/or column selects) and associated page hit results of the memory transactions. In one embodiment, the scheduler 206 may schedule memory transactions of the transaction queue 202 such that the memory transactions are processed in an order that differs from the order in which the memory transactions were stored in the transaction queue 202. In particular, the scheduler 206 may attempt to increase memory performance by altering the processing order of the memory transactions stored in the transaction queue 202 in a manner that results in a greater number of page hits. However, it should be appreciated that the scheduler 206 may not be able to reorder memory transactions freely and still maintain data coherency. For example, data ordering rules of the memory controller 106, 118, 122 may prevent the scheduler 206 from moving a memory read transaction ahead of a memory write transaction if both transactions target a common storage location of the memory 110.

The memory controller 106, 118, 122 may further comprise a bus interface 208. In the case of the memory controllers 118, 122, the bus interface 208 may apply one or more selects such as, for example, the rank select, bank select, and page select to the memory bus 112 to open a page 108 of memory 110 associated with the memory transaction. The bus interface 208 may further apply one or more selects such as, for example, the column select to the memory bus 112 to select the column 126 of the open page 108 for reading and writing. Further, the bus interface 208 of the memory controllers 118, 122 may transmit a page close message such as, for example, a page close signal and/or transmit precharge command on the memory bus 112 to cause the memory 110 to close the page 108. In the case of the memory controller 106, the bus interface 208 may generate one or more signals on the processor bus 104 to transmit a selected memory transaction and any corresponding data to the memory controller 118 of the chipset 102. Moreover, the bus interface 208 of the memory controller 106 may transmit a page close message such as, for example, a page close signal or precharge command on the processor bus 104 that indicates to the memory controller 118 of the chipset 102 whether to close the page 108 of the memory transaction.

The page manager 200 may adaptively determine whether to close pages 108 of the memory 110 based upon the effectiveness of previous page close messages. In one embodiment, the page manager 200 may comprise page state logic 210 and adaptive page close logic 212. The page state logic 210 may determine a page hit result for each memory transaction of the transaction queue 202 based upon memory selects for the memory transactions. The page state logic 210 may comprise bank registers 214 to track the most recently opened pages 108 of the banks 124 of the memory 110. In one embodiment, page state logic 210 may comprise a separate bank register 214 for each bank 124 of the memory 110 and each bank register 214 may store a page identifier such as, for example, a page select of the address decoder 204 that identifies the most recently opened page 108 of the bank 124. In particular, each bank 124 may comprise up to $2^{-t}$ pages 108 and each bank register 214 may comprise at least A bits to store an A-bit page select that identifies one of the $2^A$ pages 108 of its respective bank 124.

The page state logic 210 may further comprise multiplexers 216 and comparators 218. In one embodiment, the page state logic 210 may comprise a separate multiplexer 216 and a separate comparator 218 for each memory transaction of the transaction queue 202. Each multiplexer 216 may select a bank register 214 based upon a bank select generated by the address decoder 204 for the respective transaction, and the comparator 218 may generate a page hit result for the respective memory transaction based upon whether the respective transaction targets the most recently opened page 108 of the bank 124. In one embodiment, the comparator 218 may generate a page hit result that indicates a page hit in response to determining that the page identifier of the selected bank register 214 is equal to a page select generated by the address decoder 204 for the respective memory transaction.

As depicted, the adaptive page close logic 212 may comprise a bank state register 220 may track actions performed upon the banks 124 of the memory 110. In one embodiment, the bank state register 220 may comprise a separate state bit or field for each bank 124 of the memory 110. Further, each state field 222 may store a bank state that may indicate among other things whether the adaptive page close logic 212 decided to close a page 108 of the bank 124 in response to a previous memory transaction to the bank 124. In one embodiment, the adaptive page close logic 212 may store a 1 in a state field 222 when the adaptive page close logic 212 decides to not close a page 108 of the respective bank 124, but may store a 0 in a state field 222 when the adaptive page close logic 212 decides to close a page 108 of the respective bank 124.

The page close logic 212 may adaptively generate page close messages based upon the page hit results of the page state logic 210, bank states of the bank state register 220, and bank selects of the address decoder 204. Further, in the case of the chipset memory controller 118, the adaptive page close logic 212 may generate page close messages based further upon page close messages received from the processor 100. The adaptive page close logic 212 may comprise circuitry, firmware, software, etc. that attempts to improve perceived memory performance by successfully predicting whether to close pages 108 of the memory 110 or leave them open. In general, the adaptive page close logic 212 may attempt to close pages 108 of the memory 110 in such a manner that attempts to increase the number of page-hit accesses and/or that attempts to decrease the number of page-miss accesses.

A page-hit access may occur in response to a memory transaction accessing a page 108 that was left open in response to a previous memory transaction. For a page-hit access, the memory controller 118 may leave the page 108 open after accessing a column 126 of the page 108 for the previous memory transaction and may access a different column 126 of the open page 108 for the current memory transaction. A page-miss access may occur in response to a memory transaction accessing a closed page 108 of a bank 124 that has another page 108 opened. For a page-miss access, the memory controller 118 may close the open page 108 of the bank 124, open another page 108 of the bank 124, and access a column 126 of the newly opened page 108 for the current memory transaction. A page-miss access generally has about three times the latency as a page-hit access. A page-empty access may occur in response to a memory transaction accessing a closed page 108 of a bank 124 that has no pages 108 that are opened. For a page-empty access, the memory controller 118 may open a closed page 108 of the bank 124 and access a column 126 of the newly opened page 108 for the memory transaction. A page-empty access generally has about twice the latency as a page-hit access. Accordingly, the algorithms 224 may improve perceived memory performance by generating page close messages that increase the number of page-hit accesses and/or reduce the number of page-miss accesses to the memory 110.

In one embodiment, the adaptive page close logic 212 may comprise a neural network, genetic algorithm, and/or some other trainable circuit, firmware, and/or software logic that adapts to the effectiveness of previous page close determinations. In another embodiment, the adaptive page close logic 212 may comprise a plurality of algorithms 224 to make page close determinations and an algorithm selector 226 to select one of the plurality of algorithms 224 based upon the effectiveness of previous page close determinations.

In one embodiment, the adaptive page close logic 212 may determine that a previous page close determination was successful if the bank 124 is in an appropriate state for the current memory transaction. In particular, the adaptive page close logic 212 may determine that a previous page close determination was successful if the current memory transaction is a page-hit access and the previous page close determination for the bank 124 was to leave the page 108 open. Similarly, the adaptive page close logic 212 may determine that a previous page close determination was successful if the current memory transaction is a page-miss access and the previous page close determination for the bank 124 was to close the page 108. On the other hand, the adaptive page close logic 212 may determine that a previous page close determination was unsuccessful if the current memory transaction is a page-hit access and the previous page close determination for the bank 124 was to close the page 108. Further, the adaptive page close logic 212 may determine that a previous page close determination was unsuccessful if the current memory transaction is a page-miss access and the previous page close determination for the bank 124 was to leave the page 108 open.

Figure 5:
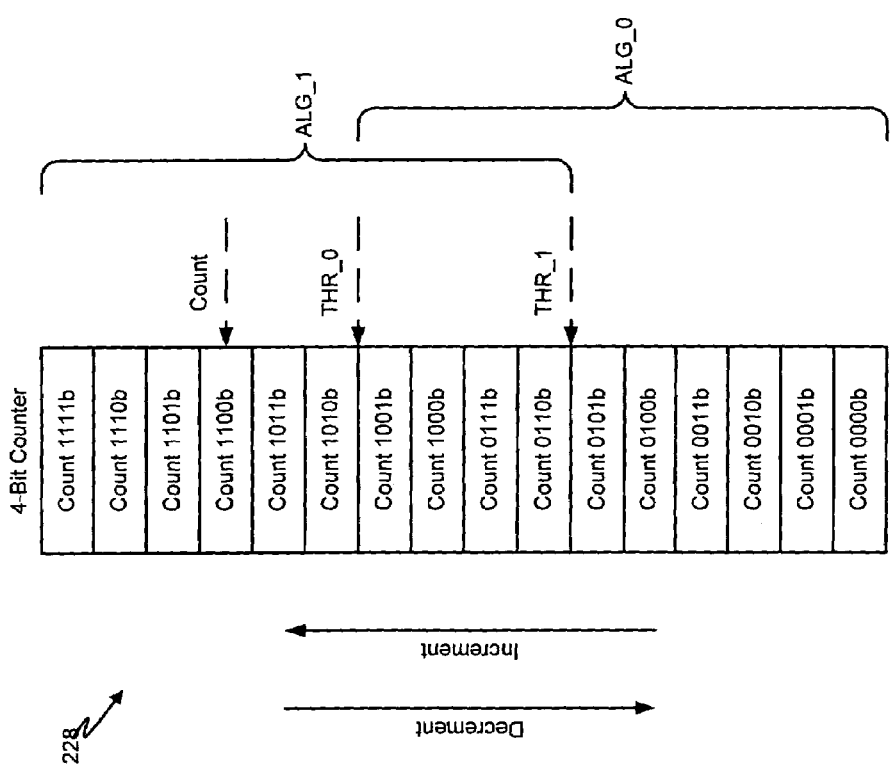
FIG. 5 illustrates an embodiment of a counter used in one embodiment of adaptive page close logic depicted in FIG. 4.

Referring now to FIG. 5, the algorithm selector 226 in one particular embodiment may comprise a counter 228 such as, for example, a four-bit counter to track the effectiveness of previously page close messages. The algorithm selector 226 may further select between a first algorithm ALG_0 and a second algorithm ALG_1 based upon the count of the counter 228. In one embodiment, the first algorithm ALG_0 may close pages 108 more conservatively than the second algorithm ALG_1, and the algorithm selector 226 may update the counter 228 per the following TABLE 1.

TABLE 1

| Current Transaction Hit/Miss | Page Close/Open | Increment/Decrement Decision |
|---|---|---|
| Hit | Open | No Action |
| Hit | Closed | Decrement |
| Miss | Open | Increment |
| Miss | Closed | No Action |

As a result of updating the count of the counter 228 per TABLE 1, a value of 1 for the most significant bit of the count may indicate more pages 108 have been left open that should have been closed than pages 108 have been closed that should have been left open. Therefore, an algorithm ALG_1 that aggressively closes pages 108 may be more appropriate when the most significant bit has a value of 1 than an algorithm ALG_0 that more conservatively closes pages 108. Conversely, a value of 0 for the most significant bit of the count may indicate that more pages 108 have been closed that should have been left open than pages 108 have been left open that should have been closed. Therefore, when the most significant bit of the count has a value of 0, the algorithm ALG_0 that conservatively closes pages 108 may be more appropriate than the algorithm ALG_1 that more aggressively closes pages 108.

Accordingly, the algorithm selector 226 in one embodiment may select the more conservative algorithm ALG_0 that is less likely to generate a page close determination to close a page than the more aggressive algorithm ALG_1. Further, the algorithm may continue to select and use the page close determination of the more conservative algorithm as long as the most significant bit of the counter 228 remains a 0. Conversely, the algorithm selector 226 may select the more aggressive algorithm ALG_1 and may use its page close determination as long as the most significant bit of the count remains a 1.

In another embodiment, the algorithm selector 226 may continue to select the more conservative algorithm ALG_0 and its page close determination until a first threshold THR_0 is passed. Similarly, the algorithm selector 226 may continue to select the more aggressive algorithm ALG_1 until a second threshold THR_1 is passed. Using separate thresholds THR_0, THR_1 may prevent or reduce thrashing situations in which the algorithm selector 226 keeps switching between algorithms in a manner that results in consistently generating unsuccessful page close messages.

As indicated above, the first algorithm ALG_0 may implement a more aggressive page closing technique and the second algorithm ALG_1 may implement a more conservative page closing technique. In particular, the first algorithm ALG_0 may determine to close a page 108 if the page states and bank states of the page state logic 210 in combination with the bank selects of the address decoder 204 indicate that the transaction queue 202 contains no memory transactions to the same page 108 as the memory transaction selected by the scheduler 206 and contains at least one memory transaction to the same bank 124 as the selected memory transaction. Further, the first algorithm ALG_0 may determine to leave the page 108 open if the page states and bank states of the page state logic 210 in combination with the bank selects of the address decoder 204 indicate that the transaction queue 202 contains at least one memory transaction to the same page 108 as the memory transaction selected by the scheduler 206.

On the other hand, the second algorithm ALG_1 may determine to close a page 108 if the page states and bank states of the page state logic 210 in combination with the bank selects of the address decoder 204 indicate that the transaction queue 202 contains no memory transactions to the same page 108 as the memory transaction selected by the scheduler 206. Further, the second algorithm ALG_1 may determine to leave the page 108 open if the page states and bank states of the page state logic 210 in combination with the bank selects of the address decoder 204 indicate that the transaction queue 202 contains at least one memory transaction to the same page 108 as the memory transaction selected by the scheduler 206.

Figure 6:
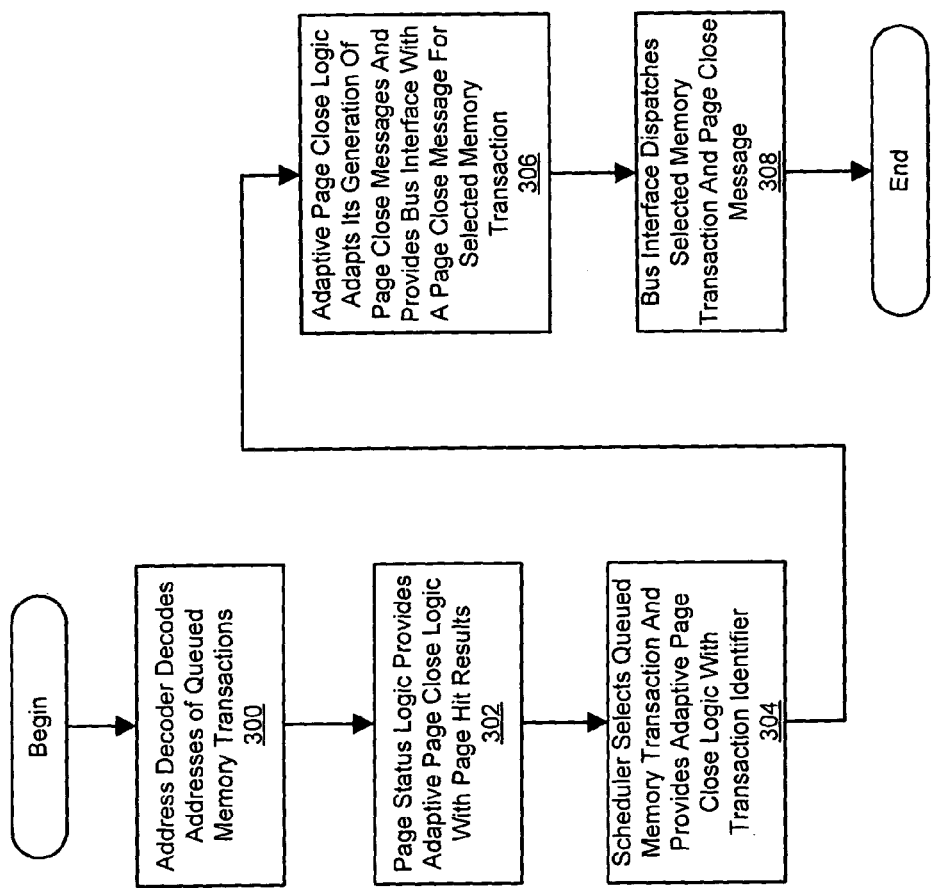
FIG. 6 illustrates an embodiment of a method that may be used by the memory controllers of FIGS. 1 and 2 to generate page close messages.

Shown in FIG. 6 is an embodiment of a method that may be used by the memory controllers 106, 118, 122 to adaptively generate page close messages and to close pages 108 based upon such page close messages. In block 300, the address decoder 204 may decode or partially decode addresses of memory transactions queued in the transaction queue 202. In one embodiment, the address decoder 204 may decode or partially decode physical addresses of the queued memory transactions to obtain bank selects and page selects for queued memory transactions. The computing device in some embodiments may support virtual addressing in which the processor 100 uses virtual addresses to access storage locations of the memory 110. The memory controller 106, 118 or 122 may translate or otherwise map the virtual addresses to physical addresses that are ultimately decoded to access storage locations of the memory 110. In such virtual addressing embodiments, the address decoder 204 may decode or partially decode virtual addresses instead to obtain virtual bank selects and virtual page selects.

In response to the receiving bank selects and page selects for the queued memory transactions, page status logic 210 in block 302 may provide adaptive page close logic 212 with page hit results for the queued memory transactions. In block 304, the scheduler 206 may select a memory transaction of the transaction queue 202 and may provide the adaptive page close logic 212 with an transaction identifier that identifies the selected memory transaction. In one embodiment, the scheduler 206 may select the memory transaction based upon, for example, the memory selects of the queued memory transactions, the page hit results of the page status logic 210, the bank states of the bank state register 220, and/or data coherency ordering rules of the scheduler 206.

While the processor 100 may provide chipset 102 with page close messages, the memory controller 118 may elect to either close or open the page 108 based upon criteria in addition to the page close message received from the processor 100. For example, the memory controller 118 may elect to close the page 108 and process another memory transaction from another processor (not shown) or component 114. Further, the memory controller 118 and or memory 110 may elect to close the page 108 and dynamically refresh the page 108 or other pages 108 of the memory 110 between the memory transaction and the second memory transaction.

In block 306, the adaptive page close logic 212 may adapt its generation of page close messages based upon the page hit result and bank state associated with the selected memory transaction. Further, the adaptive page close logic 212 may generate a page close message that indicates whether the memory 110 is to close the page 108 of the selected memory transaction. In one embodiment, the algorithm selector 224 may update the counter 228 per above TABLE 1 and may switch between page close determinations of the algorithms ALG_0 and ALG_1 based upon the count passing the thresholds THR_0 and THR_1. Furthermore, the algorithm selector 226 may update the state field 222 of the bank state register 220 that corresponds to the bank 124 to be accessed by the memory transaction.

The bus interface 208 in block 308 may dispatch the memory transaction identified by the scheduler 206 and the page close message generated by the adaptive page close logic 212. In the case of the processor memory controller 106 of FIG. 1, the bus interface 208 may transfer the memory transaction and its associated page close message to the chipset 102 via the processor bus 104 for further processing by the chipset memory controller 118. In the case of the chipset memory controller 118 of FIG. 1 and the processor memory controller 122 of FIG. 2, the bus interface 208 may generate memory select signals (e.g. bank select, page select, column select) signals and other memory control signals (e.g. write enables, row address strobes, column address strobes) on the memory bus 112 to transfer data per the selected memory transaction. Moreover, if the associated page close message requests a page 108 be closed, the bus interface 208 may provide the memory 110 with a precharge signal, a precharge command, and/or some other page close signal or message that causes the memory 110 to close the page 108 accessed by the memory transaction.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
tracking effectiveness of page close messages to place banks of a memory in an appropriate state for subsequent memory transactions, and
adapting generation of page close messages based upon the effectiveness of the page close messages.

2. The method of claim 1 further comprising
generating a page-hit result that indicates whether a selected memory transaction targets the most recently opened page of a bank of the memory, and
determining based upon the page-hit result and a current state of the bank whether a page close message for a previous memory transaction placed the bank in the appropriate state.

3. The method of claim 1 further comprising
generating a page-hit result that indicates whether a selected memory transaction targets the most recently opened page of a bank of the memory, and
determining that a page close message for a previous memory transaction did not place the bank in the appropriate state if the page-hit result indicates a page-hit access and the bank has no open pages.

4. The method of claim 1 further comprising
generating a page-hit result that indicates whether a selected memory transaction targets the most recently opened page of a bank of the memory, and
determining that a page close message for a previous memory transaction did not place the bank in the appropriate state if the page-hit result indicates a page-miss access and the bank has another page open.

5. The method of claim 1 further comprising
generating a page-hit result that indicates whether a selected memory transaction targets the most recently opened page of a bank of the memory, and
determining that a page close message for a previous memory transaction placed the bank in the appropriate state if the page-hit result indicates a page-hit access and the bank has the page open.

6. The method of claim 1 further comprising
generating a page-hit result that indicates whether a selected memory transaction targets the most recently opened page of a bank of the memory, and
determining that a page close message for a previous memory transaction placed the bank in the appropriate state if the page-hit result indicates a page-miss access and the bank has no pages.

7. The method of claim 1 further comprising
determining based upon the effectiveness of page close messages that closing pages of the memory at a greater rate may increase perceived memory performance, and
adapting generation of page close messages to more aggressively close pages of the memory.

8. The method of claim 1 further comprising
determining based upon the effectiveness of page close messages that closing pages of the memory at a lesser rate may increase perceived memory performance, and
adapting generation of page close messages to more conservatively close pages of the memory.

9. An apparatus comprising
a queue to store a plurality of memory transactions,
page state logic to generate for the plurality of memory transactions page-hit results that indicate whether the plurality of memory transactions target the most recently opened pages of a memory, and
page close logic to adaptively generate, based upon the effectiveness of prior page close determinations, a page close message for a current memory transaction of the plurality of memory transactions that indicate whether to close a page of the memory targeted by the current memory transaction.

10. The apparatus of claim 9 further comprising a bank state register to store bank states that indicate whether the most recently opened page of the respective bank is open, wherein
the page close logic determines the effectiveness of prior page close determinations based upon the page-hit results and the bank states.

11. The apparatus of claim 9 wherein the page close logic comprises
a first algorithm to generate page close determinations,
a second algorithm to generate page close determinations, and
an algorithm selector to select a page close determination for a page close message from the first algorithm and the second algorithm based upon the effectiveness of prior page close determinations.

12. The apparatus of claim 9 wherein the page close logic comprises
a first algorithm to generate page close determinations,
a second algorithm to generate page close determinations, and
an algorithm selector to update a count based upon the effectiveness of prior page close determinations and to select a page close determination for a page close message from the first algorithm and the second algorithm based upon the count.

13. The apparatus of claim 9 wherein the page close logic comprises
a first algorithm to generate page close determinations,
a second algorithm to generate page close determinations, and
an algorithm selector to update a count based upon the effectiveness of prior page close messages and to switch from page close messages the first algorithm and the second algorithm in response to the count having a predetermined relationship to a threshold.

14. A system comprising
a memory comprising at least one bank having a plurality of pages, and
a memory controller to adaptively make a page close determination for a memory transaction based upon effectiveness of one or more prior page close determinations and to close a page accessed by the memory transaction based upon the page close determination.

15. The system of claim 14 further comprising a chipset that includes the memory controller.

16. The system of claim 14 further comprising a processor that includes the memory controller.

17. The system of claim 14 further comprising
a chipset that includes the memory controller, and
a processor that comprises a memory controller that adaptively makes another page close determination for the memory transaction based upon effectiveness of one or more prior page close determinations of the processor memory controller and that provides the chipset memory controller with the memory transaction and page close messages indicative of the another page close determination.

18. The system of claim 17 wherein the chipset memory controller makes the page close determination for the memory transaction based further upon the page close message of the processor.

19. A machine-readable medium comprising a plurality of instructions that, in response to being executed, result in a computing device
tracking effectiveness of page close messages to close pages of at least one bank of a memory to decrease page-empty accesses and to increase page-hit accesses to the at least one bank of the memory, and
adaptively generating, based upon the effectiveness of the page close messages, page close messages that indicate whether to close pages of the at least one bank.

20. The machine-readable medium of claim 19 the plurality of instructions that further result in the computing device
generating a page-hit result for a memory transaction that indicates whether the memory transaction targets the most recently opened page of the at least one bank of the memory, and
determining that generation of the page close messages has been ineffective in response to the page-hit result indicating a page-hit access and a current state of the at least one bank indicating that the at least one bank has no open pages.

21. The machine-readable medium of claim 19 wherein the plurality of instructions that further result in the computing device
generating a page-hit result for a memory transaction that indicates whether the memory transaction targets the most recently opened page of the at least one bank of the memory, and
determining that generation of the page close messages has been ineffective in response to the page-hit result indicating a page-miss access and a current state of the at least one bank indicating that the at least one bank has at least one open page.

22. The machine-readable medium of claim 19 wherein the plurality of instructions that further result in the computing device
generating a page-hit result for a memory transaction that indicates whether the memory transaction targets the most recently opened page of the at least one bank of the memory, and
determining that generation of the page close messages has been effective in response to the page-hit result indicating a page-hit access and a current state of the at least one bank indicating that the at least one bank has at least one open page.

23. The machine-readable medium of claim 19 wherein the plurality of instructions that further result in the computing device
generating a page-hit result for a memory transaction that indicates whether the memory transaction targets the most recently opened page of the at least one bank of the memory, and
determining that generation of the page close messages has been ineffective in response to the page-hit result indicating a page-miss access and a current state of the at least one bank indicating the at least one bank has no open pages.

* * * * *